(12) United States Patent
Zhang et al.

(10) Patent No.: US 12,282,723 B2
(45) Date of Patent: Apr. 22, 2025

(54) STANDARD CELL CHARACTERIZATION FOR INTERNAL CONDUCTIVE LINE OF CELL

(71) Applicant: TAIWAN SEMICONDUCTOR MANUFACTURING COMPANY LTD., Hsinchu (TW)

(72) Inventors: Shi-Han Zhang, Hsinchu (TW); You-Cheng Lai, Hsinchu (TW); Jerry Chang Jui Kao, Taipei (TW); Pei-Wei Liao, Hsinchu (TW); Shang-Chih Hsieh, Taoyuan County (TW); Meng-Kai Hsu, Hsinchu County (TW); Chih-Wei Chang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 677 days.

(21) Appl. No.: 17/671,979

(22) Filed: Feb. 15, 2022

(65) Prior Publication Data

US 2023/0259680 A1 Aug. 17, 2023

(51) Int. Cl.
| | | |
|---|---|---|
| *G06F 30/3312* | (2020.01) | |
| *G03F 1/70* | (2012.01) | |
| *G06F 30/392* | (2020.01) | |
| *G06F 30/394* | (2020.01) | |
| *G06F 119/12* | (2020.01) | |

(52) U.S. Cl.
CPC ............ *G06F 30/3312* (2020.01); *G03F 1/70* (2013.01); *G06F 30/392* (2020.01); *G06F 30/394* (2020.01); *G06F 2119/12* (2020.01)

(58) Field of Classification Search
USPC ........................................................ 716/113
See application file for complete search history.

(56) References Cited

U.S. PATENT DOCUMENTS

| | | | |
|---|---|---|---|
| 10,318,663 B2 * | 6/2019 | Cheng ...................... G06F 30/20 |
| 2012/0042290 A1 * | 2/2012 | Berkens .............. G03F 7/70525 716/55 |
| 2013/0338987 A1 * | 12/2013 | Cheng ................... G06T 11/206 703/10 |
| 2020/0152567 A1 * | 5/2020 | Kandukuri ............ H01L 23/528 |
| 2023/0259680 A1 * | 8/2023 | Zhang .................. G06F 30/398 430/5 |

FOREIGN PATENT DOCUMENTS

JP  2003271690 A  *  9/2003  ......... G06F 17/5068

* cited by examiner

*Primary Examiner* — Mohammed Alam
(74) *Attorney, Agent, or Firm* — WPAT LAW; Anthony King

(57) ABSTRACT

A method including: providing a design data of an integrated circuit (IC), the design data comprising a first cell; identifying a first conductive line in the first cell as a critical internal net of the first cell, wherein the first conductive line is electrically connected between an input terminal of the first cell and an output terminal of the first cell; providing a library of the first cell, wherein the library includes a table of timing or power parameters of the first cell based on a multidimensional input set associated with the critical internal net; updating the design data by determining a timing or power value of the first cell based on the table; performing a timing analysis on the updated design data; and forming a photomask based on the updated design data.

20 Claims, 13 Drawing Sheets

```
MACRO CELL_NAME
   CLASS CORE ;
   ORIGIN 0 0 ;
   SIZE SIZEX BY SIZEY ;
   SYMMETRY X Y ;
   SITE core ;
   PIN I
      DIRECTION INPUT ;
      USE SIGNAL ;
      PORT
         LAYER M1 ;
         RECT XA1 YA1 XA2 YA2 ;
      END
   END I
   PIN Z
      DIRECTION OUTPUT ;
      USE SIGNAL ;
      PORT
         LAYER M1 ;
         RECT XB1 YB1 XB2 YB2 ;
      END
   END Z
   OBS
      LAYER M0 ;
      RECT XC1 YC1 XC2 YC2 ;
      NET INT1
         LAYER M0 ;
         RECT XD1 YD1 XD2 YD2 ;
      END INT1
   EBD
END CELL_NAME
```

FIG. 4

STANDARD CELL CHARACTERIZATION FOR INTERNAL CONDUCTIVE LINE OF CELL

BACKGROUND

In advanced semiconductor technologies, continuing reduction in device size and increasingly complex circuit arrangements have made the design and fabrication of integrated circuits (ICs) more challenging and costly. In the flow of modern circuit design methodology, the designed circuit must be tested to confirm it meets the design specification and manufacturing criteria before it is delivered for mass production. Such confirmation of millions of transistor devices is difficult, if not impossible, to accomplish manually in an efficient and precise manner. Electronic Design Automation (EDA) tools have been introduced to aid in designing and troubleshooting the electronic circuits to increase design efficiency and reduce design errors. Moreover, various design libraries are provided to reduce the effort of building commonly used functional blocks in the circuit.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 4 is an excerpt of an abstract view of a cell, in accordance with some embodiments of the present disclosure.

DETAILED DESCRIPTION

Figure 1:
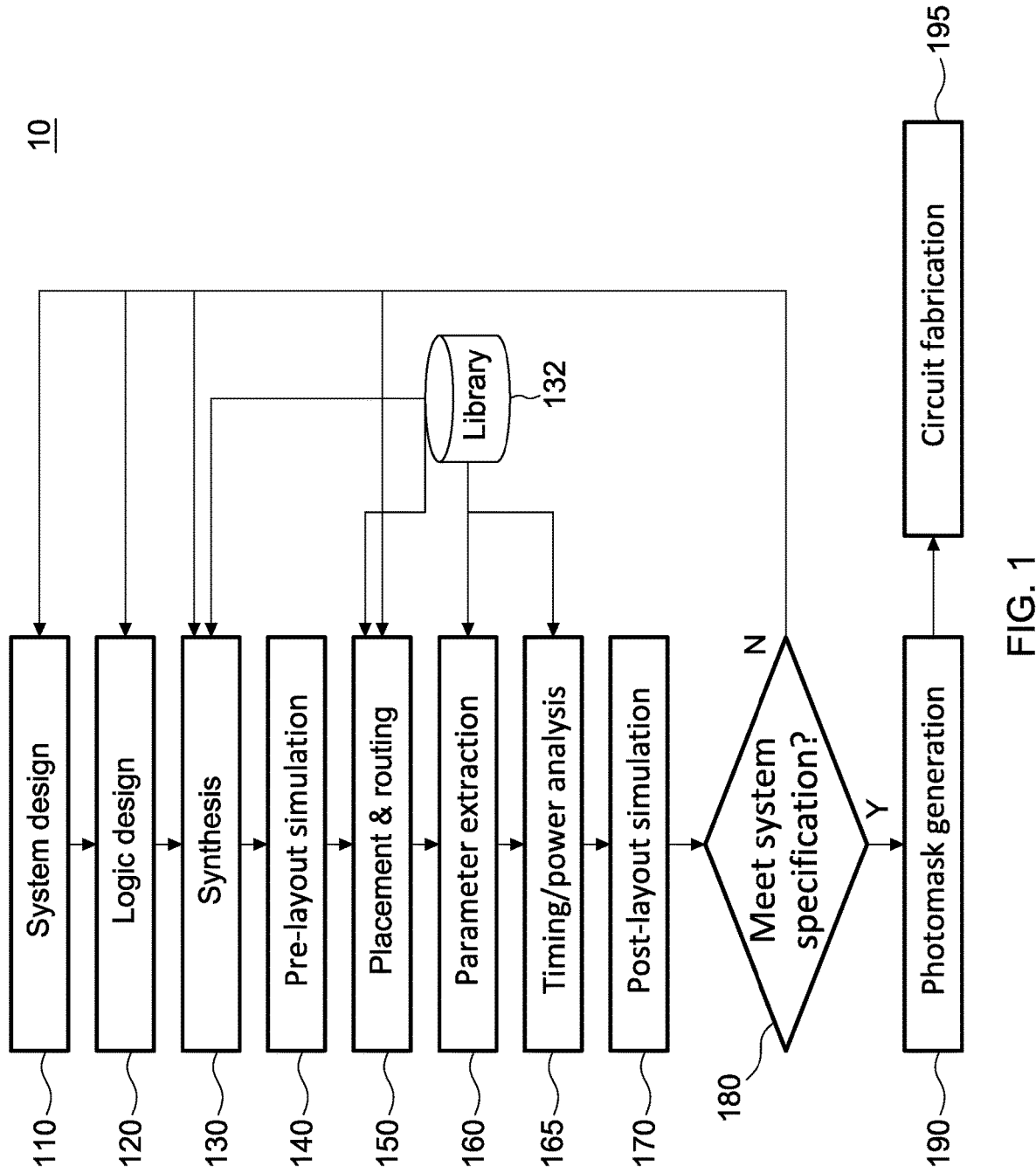
FIG. 1 is a schematic diagram illustrating a design flow of an integrated circuit (IC), in accordance with some embodiments of the present disclosure.

In the following detailed description, numerous specific details are set forth in order to provide a thorough understanding of the present disclosure. However, it will be understood by those skilled in the art that the present disclosure may be practiced without these specific details. In other instances, well-known methods, procedures, components and circuits are not described in detail so as not to obscure the present disclosure.

Further, the present disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

The terms "layout," "design layout" and "mask layout" used throughout the present disclosure refer to a representation of an integrated circuit (IC) in terms of geometric patterns which correspond to the features of the IC, such as a metal layer, a dielectric layer, or a semiconductor layer that make up the components of the IC. In some examples, the terms "layout," "design layout" and "mask layout" refer to a data file including machine-readable codes or text strings that can be converted into the geometric patterns. Additional information, such as parameters extracted from the geometric patterns, in relation to the IC may be included in the layout or design layout for enhancing the design and manufacturing processes of the IC.

The term "cell" used throughout the present disclosure refers to a group of circuit patterns in a design layout to implement specific functionalities. A cell is comprised of various patterns and may be expressed as unions of polygons. A design layout may be initially constructed by an array of identical or different cells during the layout design stage. The geometries of the patterns in the cells may be adjusted at different stages of layout design in order to compensate for design and process effects. A cell may cover circuits corresponding to a portion or an entirety of a die to be manufactured, or a group of dies. A mask may be formed to implement the patterns of one or more cells thereon and to transfer these cell patterns to a semiconductor substrate or wafer.

The present disclosure discusses a method, a system, and an associated non-transitory computer readable storage medium for cell library characterization framework to determine the timing and power parameters of a cell in the design stage of manufacturing semiconductor ICs. When a synthesis operation is used for implementing a circuit design, e.g., a circuit layout or simply a layout, the circuit design may be formed of various commonly used functional blocks. One or more standard cell libraries are usually involved to provide details of these functional blocks for facilitating the design process. The standard cell libraries may include a variety of standard cells with associated parameters characterizing the electrical or geometric characteristics of the cells from a quantitative perspective. Among the various cell parameters, timing delays, timing constraints, and power consumption are widely used for characterizing the performance of a cell.

Timing delays of a cell, e.g., an inertial delay or a transport delay, are one type of timing parameters and are provided in a form of a timing table or a timing array with entries of timing delay values for reflecting the estimated time delay periods experienced by the respective cells in a fabricated chip. Similarly, timing constraints of a cell, e.g., a rising time and a falling time, are one type of timing parameters and are provided in a form of a timing table or a timing array with entries of timing constraint values for reflecting the time periods required by the respective cells for ensuring proper functionality of the cells in a fabricated chip. In addition, power parameters of a cell are also provided in a form of a power table or a power array with entries of power values for reflecting the estimated power consumption experienced by the respective cells in a fabricated chip. These timing and power parameters are dependent upon the detailed design of the cell, and thus are usually predetermined in the standard cell libraries by the cell designer, e.g., a third-party library provider. Since the internal components of the cells between input pins and output pins of the respective cells may be deemed as fixed most of the time, the timing parameters and power parameters provided by the standard cell libraries are usually determined by only taking into account the circuit portions connected to the cells, and taking care of the extra timing and power budgets resulting from the adjustment of the cell configuration by increasing the global timing and power margins of the overall circuit. However, the increase of the non-selective timing and power budget framework would lead to unnecessary area and performance loss. Additionally, there is a trend of an increasing number of internal nets within the cell that need adjustment for compliance with the design rule during the placement and routing operation. As a result, existing design processes may not be adequate in covering the variation range of the timing or the power parameters due to the change of the internal nets of the cells. The performance of the analysis and verification process may be degraded.

In the present disclosure, an improved cell characterization method and a system for implementing the method are proposed. An abstract view and improved cell timing and power parameters are provided by taking into account at least one internal net in a cell as a critical internal net in a library kits generation process. The cell profile will include the timing and power parameters by considering the influence of the critical internal net with various geometric configurations. As a result, the candidate timing delays, timing constraints and powers provided by the standard cell library can aid in providing more accurate estimates of timing delays and powers of the cell and reducing the likelihood of overestimating the timing performance or power consumption. In addition, the finalized circuit design can be fabricated with less unnecessary wastage of area or power.

FIG. 1 is a schematic diagram illustrating a design flow 10 of a semiconductor integrated circuit (IC), in accordance with some embodiments. The design flow 10, employed for designing semiconductor ICs or chips, utilizes one or more electronic design automation (EDA) tools to perform operations therein. A standalone computing device or a computing cluster, such as a workstation, a personal computer or a group thereof, is typically used in executing the method of the design flow 10. The design flow 10 includes a system design stage 110, a logic design stage 120, a synthesis stage 130, a pre-layout simulation stage 140, a placement and routing stage 150, a parameter extraction stage 160, a timing/power analysis stage 165, a post-layout simulation stage 170, a photomask generation stage 190 and a circuit fabrication stage 195.

Initially, at the system design stage 110, a systematic architecture for the chip of interest is provided with a high-level description. During stage 110, the chip functions along with performance requirements are determined according to a design specification. The chip functions are usually represented by respective schematic functional modules or blocks. In addition, an optimization or performance trade-off may be sought to achieve the design specification at acceptable levels of cost and power.

At the logic design stage 120, the functional modules or blocks are described in a register transfer level (RTL) using a hardware description language. Commercially available language tools are generally used, such as Verilog or VHDL. In an embodiment, a preliminary functionality check is performed during stage 120 to verify if the implemented functions conform to the specification set forth in stage 110.

In some embodiments, a timing verification is performed to determine if the RTL-level circuit design complies with the specification.

Subsequently, at the synthesis stage 130, the modules in the RTL descriptions are converted into an instance of design data, e.g., netlist data, where the circuit structure, e.g., logic gates and registers, of each function module are established. In an embodiment, a library 132, e.g., a standard cell library, is provided to supply different classes of low-level circuits, i.e., standard cells, serving specific Boolean logic or sequential logic functions. In some embodiments, technology mapping of logic gates and registers to available cells in the standard cell libraries are conducted. Further, design data or netlist data is provided to describe the functional relationship of the chip at a gate level. The library 132 may be provided by an IC designer, an IC manufacturing company, an EDA tool provider or any relevant third party. The library 132 also provides the parameters associated with each cell, such as the timing delays, timing constraints, powers, voltages, currents, and the like. In an embodiment, the netlist data is transformed from the gate-level view to a transistor-level view. In an embodiment, when the library is provided or updated (as will be described in subsequent paragraphs herein) and incorporated into the EDA tool, the IC designer can identify violations of the design rule (e.g., timing violations) and revise the original netlist data in response to the identified violations.

Subsequently, the gate-level netlist data is verified at the pre-layout simulation stage 140. During the verification process of stage 140, if some functions fail the verification in the simulation, the design flow 10 may be paused temporarily or may go back to stage 110 or 120 for further modification. In some embodiments, a timing verification is also performed during the simulation to determine if the synthesized netlist data complies with the specification. After the pre-layout simulation stage 140, the chip design has passed a preliminary verification and the front-end design process is completed. Next, a backend physical design process is conducted.

During the placement and routing stage 150, a physical architecture of the chip, determined during the front-end process, is implemented. Although not stated expressly, the layout development may include a floorplan stage in the beginning of or prior to the placement and routing stage 150, in which the floorplan stage is used for allotting spaces for major functional blocks in a two-dimensional circuit plane. Subsequently, the layout development involves a placement operation and a routing operation in sequence. The placement and routing stage 150 is also referred to as an automatic placement and routing (APR) operation herein. Detailed structures and associated geometries for the components of the major blocks in the floorplan stage are determined in the placement operation. Interconnects among different components are routed subsequent to the placement operation. Both placement and routing operations are performed to meet the requirement of a design rule check (DRC) deck so that the manufacturing constraints of the chip are fulfilled. In an embodiment, a clock tree synthesis operation is performed at the placement and routing stage for a digital circuit, in which clock generators and circuits are incorporated into the design layout. In an embodiment, a timing analysis or verification operation is performed to determine whether the tentative circuit arrangements meet the design specification, and a post-routing operation is performed subsequent to the preliminary routing operation in order to resolve timing issues discovered during the timing verification operation. Once the placement and routing stage 150 is completed, a placed-and-routed layout is created and a netlist along with data on placement and routing is generated accordingly.

During the parameter extraction stage 160, a layout parameter extraction (LPE) operation is conducted to derive layout-dependent parameters, such as parasitic resistance and parasitic capacitance, based on the layout developed in the placement and routing stage 150. Subsequently, a post-layout netlist data, which includes the layout-dependent parameters, is generated.

Subsequently, a timing analysis or timing verification is performed at a timing/power analysis stage 165. The timing and power verification performed in stage 165 may take into account the layout-dependent parameters extracted in stage 160, and better reflect the circuit behavior under the effects of parasitic resistance and capacitance. The library 132 may be involved in the timing and power analysis operation of stage 165.

During the post-layout simulation stage 170, a physical circuit behavior verification is performed, taking into consideration the parameters acquired in previous stages. A simulation of transistor-level behavior is conducted to examine whether the chip performance derived by the post-layout netlist meets the system specifications. In some embodiments, the post-layout simulation is performed to minimize the probability of electrical issues or layout implementation difficulties during the chip manufacturing process. In an embodiment, the library 132 is provided not only for stage 130, but also for stages 140, 150, 160, 165, and 170 so that the electrical or geometric parameters of cells and other features stored in the library 132 can be leveraged to emulate the real-world performance of the circuits.

Next, in stage 180, it is determined whether the post-layout netlist meets the design specifications. If the result of the post-layout simulation is unfavorable, the design flow 10 loops back to previous stages for tuning functionalities or structures. For example, the design flow 10 may loop back to stage 150, where the layout is re-developed to resolve issues from a physical perspective. Alternatively, the design flow 10 may retreat to an earlier stage 110 or 120 to recast the circuit design from a functional level in case the problems cannot be resolved within the back-end process.

If the post-layout netlist passes the verification, the circuit design is accepted and then signed off accordingly. The circuit is manufactured according to the accepted post-layout netlist. In an embodiment, during stage 190, at least one photomask is generated based on the verified post-layout netlist in stage 170. A photomask is a patterned mask used to allow a portion of light to pass through or reflect off the photomask while blocking or absorbing other portions of the light in order to transfer a pattern of the circuit features of the layout onto a light-sensitive layer, e.g., a photoresist layer, on a wafer. In some embodiments, a multi-layer layout netlist may require a set of photomasks, in which the feature pattern in each layer is established in the corresponding photomask.

During stage 195, the circuit is fabricated on the wafer using the patterns on the photomasks generated in stage 190. The fabrication may involve known semiconductor manufacturing operations, such as photolithography, etching, ion implantation, deposition, and thermal operations. For example, in a photolithography operation, the photomask is arranged over a material layer of a wafer, and the patterns of the layout formed on the photomask are transferred to the light-sensitive layer through an exposure operation and a development operation. The material layer is patterned using the patterned light-sensitive layer as a patterning mask. One or more material layers may be formed on the wafers to fabricate the circuit. In some embodiments, a testing operation may be utilized in an intermediate or final phase of stage 195 to ensure physical and functional integrity of the fabricated circuit. In some embodiments, a singulation operation may be used to separate the circuit wafer into individual circuit dies or chips. The fabrication of the circuit is thus completed.

The design flow 10 illustrated in FIG. 1 is exemplary. Modifications to the above-mentioned stages, such as changes of order of the stages, partition of the stages, and deletion or addition of stages, are within the contemplated scope of the present disclosure.

Figure 2:
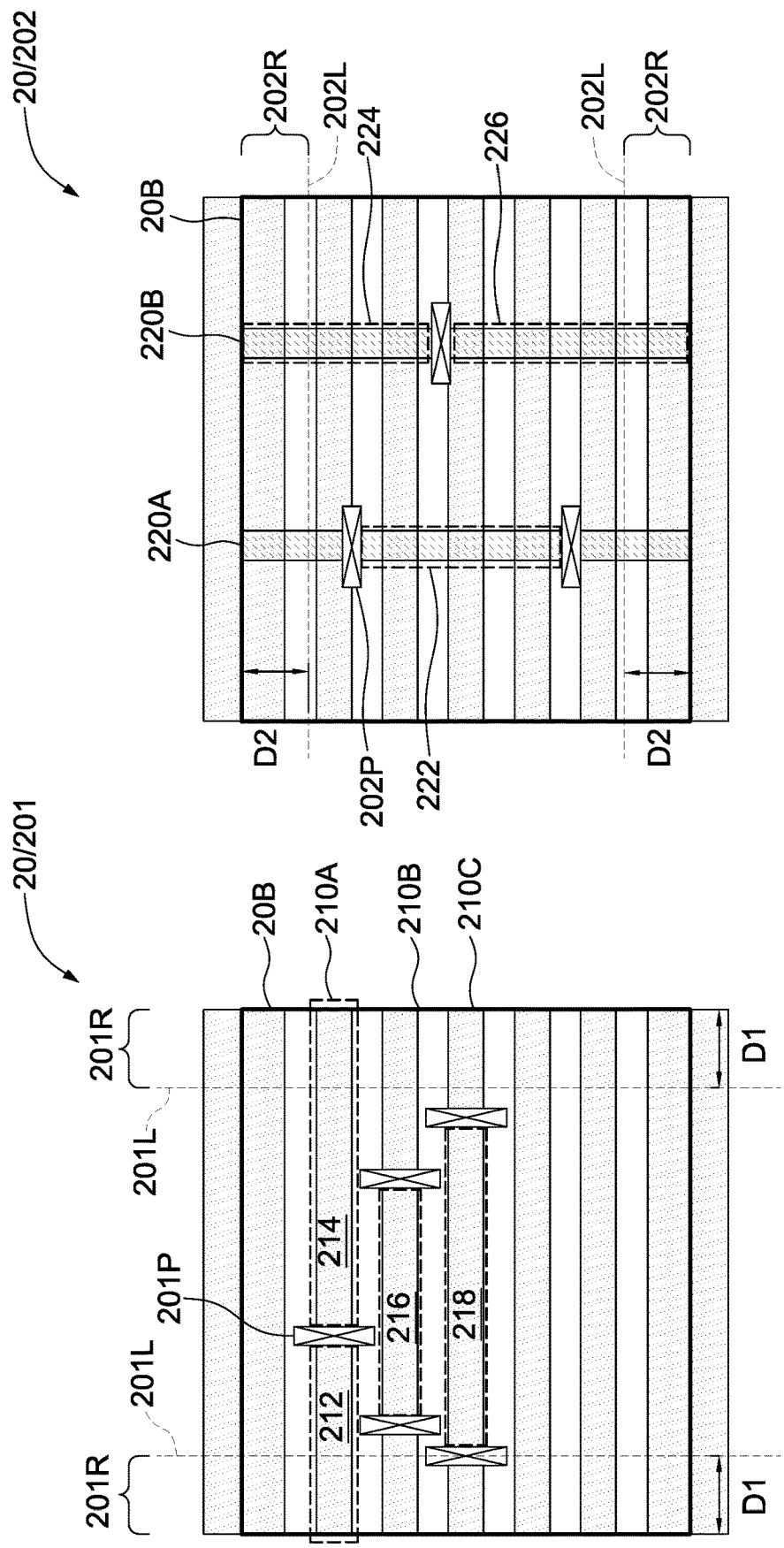
FIGS. 2A and 2B are schematic diagrams of layouts of cell in different layers, in accordance with some embodiments of the present disclosure.

FIGS. 2A and 2B are schematic diagrams of layouts of a first layer 201 and a second layer 202, respectively, of an exemplary cell 20, in accordance with some embodiments of the present disclosure. In some embodiments, the cell 20 has a quadrilateral shape, such as a rectangular shape or a square shape, and is defined by a cell boundary 20B. In some embodiments, the cell boundary 20B is formed of an upper side, a lower side, a left side and a right side. Referring to FIG. 2A, the first layer 201 of the cell 20 includes a plurality of conductive lines 210 (including conductive lines 210A and 210B) parallel to each other and extending in a horizontal direction, e.g., X-direction. Each of the conductive lines 210 may have equal or unequal widths measured in a vertical direction, e.g., Y-direction. In some embodiments, the conductive lines 210 arranged on the upper side and the lower side of the cell 20 may be configured as power lines, while the other conductive lines 210 arranged between the upper and lower conductive lines 210 may be configured as signal lines, in which the signal lines have a width less than the power lines. Similarly, referring to FIG. 2B, the second layer 202 of the cell 20 is arranged a layer over the first layer 201. The second layer 202 includes a plurality of conductive lines 220 (including conductive lines 220A and 220B) parallel to each other and extending in the vertical direction, e.g., Y-direction. Each of the conductive lines 220 may have equal or unequal widths measured in the horizontal direction.

In some embodiments, the conductive lines 210 are partitioned into multiple line segments to increase utilization of the conductive lines or reduce connection resistance. For example, the conductive line 210A in the first layer 201 is partitioned into shorter conductive line segments 212 and 214 by a partitioning feature 201P. The partitioning feature 201P may be implemented by an insulating material in the fabricated circuit, e.g., a dielectric layer. Similarly, a conductive line segment 216 is formed by cutting two ends of the conductive line 210B by two partitioning features 201P crossing the conductive line 210B, while a conductive line segment 218 is formed by cutting two ends of the conductive line 210C by two partitioning features 201P crossing the conductive line 210C. The number and lengths of the partitioned conductive line segments are determined by the number and locations of the partitioning features 201P.

Likewise, in the second layer 202, a conductive line segment 222 is formed by cutting two ends of the conductive line 220A by two partitioning features 202P crossing the conductive line 220A. Conductive line segment 224 and 226 are formed by cutting the conductive line 220B by a partitioning features 202P crossing the conductive line 220B. The number and lengths of the partitioned conductive line segments are determined by the number and locations of the partitioning features 202P.

Throughout the present disclosure, the conductive line segments, e.g., 212, 214, 216, 218, 222 and 224, formed from the respective conductive lines 210A, 210B, 201C, 220A and 220B, are also referred to as another type of conductive lines for convenience of reference.

In some embodiments, some of the conductive lines 210 and 220 may be configured as an input pin or output pin serving as an input terminal or output terminal to connect to another cell or other features. Further, some of the conductive lines 210 and 220 may be configured as internal conductive lines, also referred to as internal nets herein, to construct an interconnect structure for electrically connecting the features of the cell 20 between the input pin and the output pin, or electrically connecting to the power lines. Additionally, some of the conductive lines 210 and 220 may not be functional and thus are floating in the cell 20.

In some embodiments, the first layer 201 includes two partitioning lines 201L extending in the vertical direction to define two peripheral regions 201R, in which a first peripheral region 201R is a rectangular region between the left side of the cell 20 and a left partitioning line 201L, while a second peripheral region 201R is a rectangular region between the right side of the cell 20 and a right partitioning line 201L. The peripheral region 201R may have a width D1 measured in the horizontal direction. In some embodiments, a ratio of the width D1 to a width of the cell 20 measured in the horizontal direction is between about 2% and about 30%, between about 10% and about 25%, or between about 10% and about 20%. In some embodiments, the width D1 is defined as a pitch between adjacent gate electrodes in the cell 20.

The peripheral region 201R is used to determine whether a conductive line, especially an internal net, of the cell 20 is to be identified as a critical internal net. If any portion of an internal net falls on the peripheral region 201R, such internal net is identified as a critical internal net. As illustrated in FIG. 2A, the conductive lines 212 has one end extending to the first peripheral region 201R, and the conductive lines 214 has one end extending to the second peripheral region 201R. As a result, the conductive lines 212 and 214 are identified as critical internal nets. In some embodiments, the conductive line 212 or 214 may be adjusted to extend for serving the purpose of, e.g., complying with the design rule and the analysis result, or to form a process-friendly structure in a subsequent routing or re-engineering process. As a result, the conductive line 212 or 214 may extend beyond the cell boundary 20B from the left side or the right side, respectively, of the cell 20. The exceeding portion of the extended conductive line 212 or 214 may lead to noticeable capacitive or resistive effects as compared to other conductive lines of the cell 20. As such, identification of such critical internal net 212 or 214 may help improve the timing parameter and power parameter of the cell 20, rather than dealing with the cell 20 as a "black box", i.e., all of the conductive lines of the cell 20 are regarded as a collective conductive structure.

In contrast, the conductive lines 216 and 218 do not fall on any of the peripheral regions 201R, and thus are not identified as critical internal nets. That may be because even if the conductive line 216 or 218 will be extended in a subsequent analysis and verification process, the width D1 of the peripheral region 201R would suffice to accommodate the extended portion of the conductive line 216 or 218. The extended conductive line 216 or 318 may still not extend beyond the cell boundary 20B. Therefore, the effect of the extended conductive line 216 or 218 can be covered by the cell profile of the cell 20 using the original cell characterization.

Likewise, referring to FIG. 2B, the second layer 202 includes two partitioning lines 202L extending in the horizontal direction to define two peripheral regions 202R, in which a third peripheral region 202R is a rectangular region between the upper side of the cell 20 and an upper partitioning line 202L, while a fourth peripheral region 202R is a rectangular region between the lower side of the cell 20 and a lower partitioning line 202L. The peripheral region 202R may have a width D2 measured in the vertical direction. In some embodiments, a ratio of the width D2 to a height of the cell 20 measured in the vertical direction is between about 2% and about 30%, between about 10% and about 25%, or between about 10% and about 20%. In some embodiments, the width D2 is defined as a pitch between adjacent gate electrodes in the cell 20. In some embodiments, the width D1 is equal to or unequal to the width D2.

As illustrated in FIG. 2B, the conductive lines 224 has one end extending to the third peripheral region 202R, and the conductive lines 226 has one end extending to the fourth peripheral region 202R. As a result, the conductive lines 224 and 226 are identified as critical internal nets. In contrast, the conductive line 222 does not fall on any of the peripheral regions 202R, and thus are not identified as a critical internal net.

Figure 3:
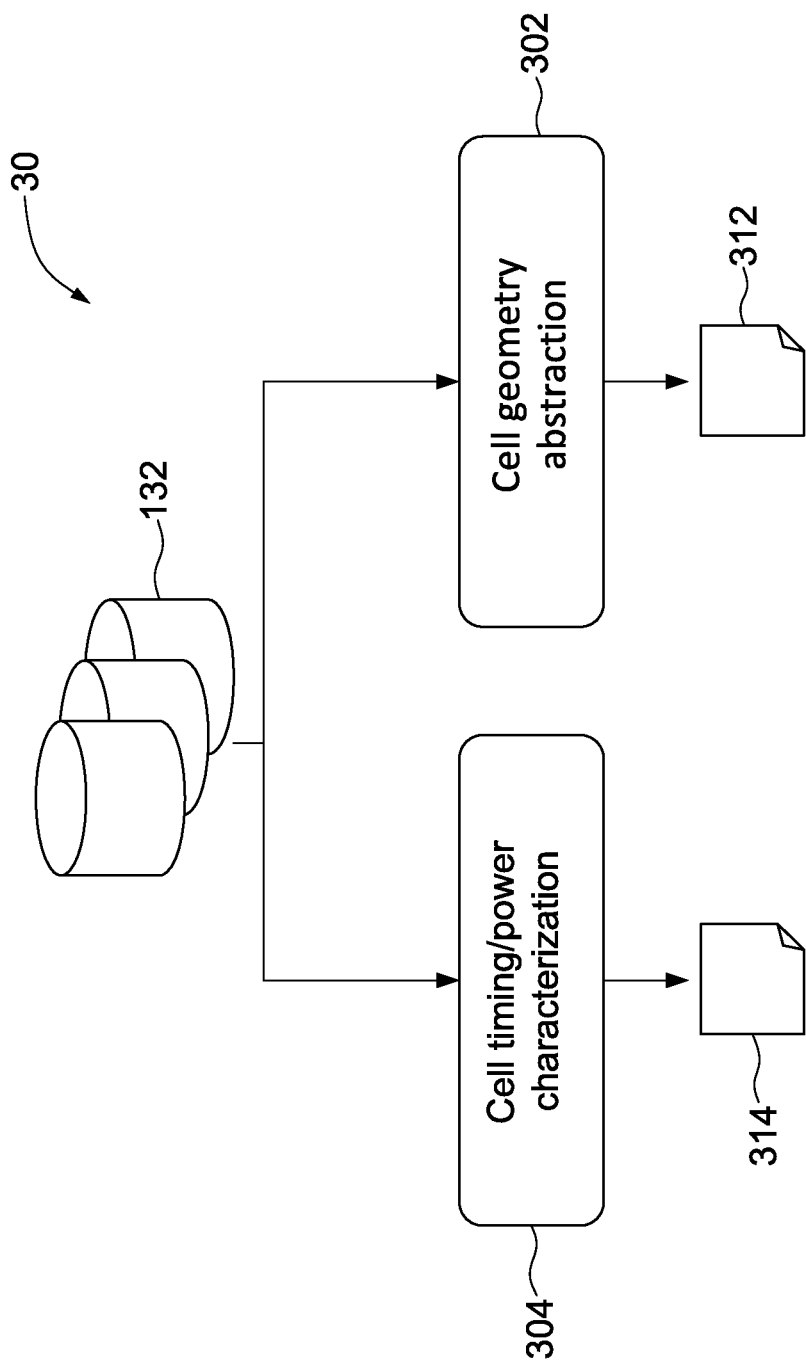
FIG. 3 is a schematic diagram of a cell library kits generation process, in accordance with some embodiments of the present disclosure.

Referring to the design flow 10 of FIG. 1, when a circuit design is synthesized at stage 130, the cell library 132 is involved to provide low-level circuit details of the common blocks of the circuit design. In some embodiments, the cell library 132 is updated to incorporate one or more cell characteristics to better describe the cell profile of the cells in the cell library 132. In some embodiments, data of the cell library 132 is used in a cell library kits generation process to generate an abstract view of the cell. FIG. 3 is a schematic diagram of a method 30 of cell library kits generation process, in accordance with some embodiments of the present disclosure. At step 302, a cell abstraction process is performed, in which cell profile data in the cell library 132 is processed to abstract basic information of one or more cells, e.g., the cell 20. Information on the geometries of features of the cell 20 is abstracted based on the cell profile data of the cell library 132. For example, the cell size, the cell location, the cell orientation of the cell 20 are extracted. In some embodiments, for each input pin and output pin of the cell 20, the respective pin sizes and pin orientations are also abstracted.

In some embodiments, each internal net of the cell 20, which is categorized as an obstruction (OBS) net is also identified. The internal net can be a conductive line extending horizontally or vertically in a layer (e.g., metal line layer) of the cell 20, and the internal net is connected to another layer through a conductive via in a metal via layer of the cell 20. In contrast to the input pin and the output pin of the cell 20 which are accessible by adjacent cells or other external conductive features, the internal nets of the cell 20 are not accessible directly by external cells or features. Geometric information of each internal net, e.g., the shape of the internal net, the location of the internal net, and the connection relationship between this internal net and the conductive vias connected thereto, are abstracted. In some embodiments, during identification of the internal net, if any of the internal net fulfills the requirement of a critical internal net, this internal net is abstracted explicitly. For example, one or more of the location, the shape, the coordinates, the size or the orientation of the critical internal net is collected in the abstracted information of the cell 20. The abstracted information of the cell 20 is output as an abstract view of the cell 20, associated with the library 132, and represented in a form of an abstraction file 312, e.g., library exchange format (LEF).

FIG. 4 is an abstract view 400 of the cell 20, in accordance with some embodiments of the present disclosure. The abstract view 400 may be implemented as the file 312 shown in FIG. 3. The abstract view 400 illustrated in FIG. 4 may only show part of a complete abstract view for the cell 20 with other parts of the complete abstract view omitted from FIG. 4 for clarity. The abstract view 400 declares a cell macro with a cell name CELL_NAME to define abstracted information of the cell 20. For example, the parameters such as "CLASS," "ORIGIN" and "SIZE" declare the cell class, a reference origin, and the cell size, respectively, of the cell 20. Specifically, in the section for the obstruction nets "OBS", any inaccessible area by external features are identified by its layer index, e.g., "M0", along with its shape and size, where the size of the obstruction net is represented by the coordinates of the vertices of the rectangle in the layer "M0." Further, another exemplary critical internal net with an identifier "INT1" is exposed to the abstract view 400, in which information on the critical internal net "INT1," e.g., the layer index "M0," the shape, the coordinates, the location, or the size of the critical internal net "INT1" are declared in the abstraction data for the critical internal net "INT1." The critical internal net "INT1" may correspond to the conductive line 212 or 214 in the layer 201 shown in FIG. 2A, or may correspond to the conductive line 224 or 226 in the layer 202 shown in FIG. 2B.

Referring to FIG. 3, in some embodiments, data of the cell library 132 is used in the cell library kits generation process to generate or update the library kits associated with the cell library 132. Data of the cell library 132 is fed to a step 304 of providing timing and power parameters of one or more cells, e.g., the cell 20. During step 304, the timing and power parameters of the cell 20 are characterized based on the data provided by the cell library 132. For example, timing delays, timing constraints and power consumption values of the cell 20 are characterized based on a multi-dimensional input set, wherein the multi-dimensional input set includes an input slew rate (or input transition time) and an output capacitance for the cell 20. Further, the multi-dimensional input set includes resistance and capacitance associated with at least one internal net identified in the cell 20, e.g., the conductive lines 212, 214, 224 and 226. The timing and power parameters characterized through step 304 are outputted as a library file 314 associated with the library 132. Some examples of characterizing the timing and power parameters based on the library 132 with the associated library files 312 and 314 are provided below.

Figure 5:
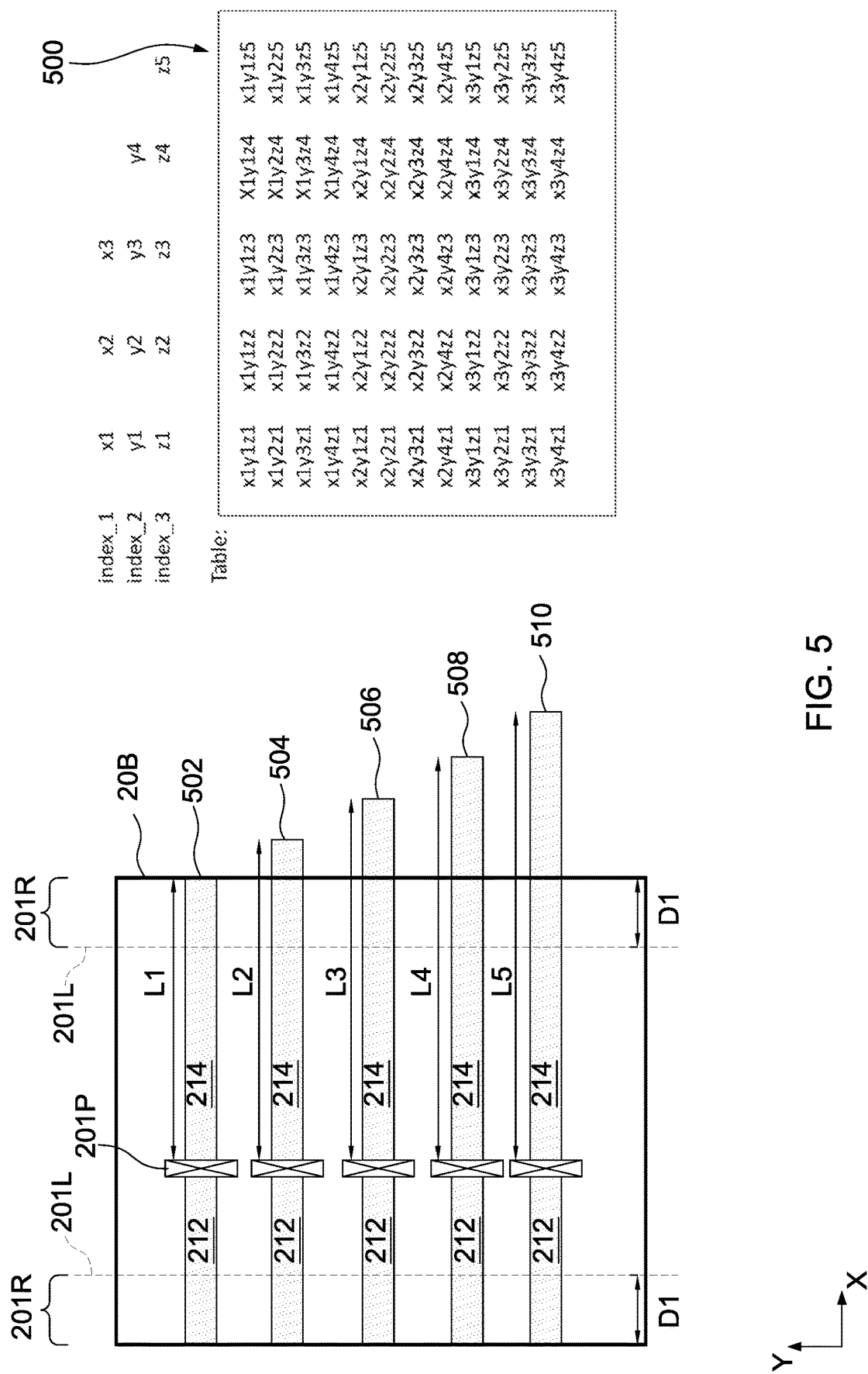
FIG. 5 is a table of timing or power parameters of a cell given a multi-dimensional parameter set, in accordance with some embodiments of the present disclosure.

FIG. 5 is a table 500 of timing or power parameters of the exemplary cell 20 formed based on a multi-dimensional parameter set, in accordance with some embodiments of the present disclosure. Table 500 is a predetermined lookup table generated based on the profile of the cell 20 and an estimated combination of interconnection configurations for the cell 20. Referring to FIG. 5 and FIGS. 2A, 2B and FIG. 3, the table 500 is provided based on the files 312 and 314 to include an array with entries representing a timing delay value, timing constraint value or power value given a specific combination of an input set. The input set may be formed of more than two input variables, e.g., index_1, index_2 and index_3. The input set includes variables associated with the circuits connected to the input pin of the cell 20, the circuits connected to the output pin of the cell 20, and a critical internal net of the cell 20, e.g., the conductive line 214.

In some embodiments, as far as the determination of the timing delays, timing constraints and powers is concerned, the first input variable index_1 represents the input transition time or input slew rate for the cell 20, for which three predetermined candidate values x1, x2 and x3 are provided to serve as the three representative input slew rate values for the cell 20. In some embodiments, as far as the determination of the timing delays and powers is concerned, the second input variable index_2 represents the output capacitance of the cell 20, for which four predetermined candidate values y1, y2, y3 and y4 are provided to serve as the four representative output capacitance values for the cell 20. In some embodiments, as far as the determination of the timing constraints is concerned, the second input variable index_2 represents the input clock slew rate of the cell 20, for which four predetermined values y1, y2, y3 and y4 are provided to serve as the four representative input slew rate values for the cell 20.

In some embodiments, as far as the determination of the timing delays, timing constraints and powers is concerned, the third variable index_3 represents the capacitance associated with the critical internal net, i.e., the conductive line 214, of the cell 20, for which five predetermined candidate values z1, z2, z3, z4 and z5 are provided to serve as the five representative capacitances associated with the critical internal net for the cell 20. As illustrated in the left plot of FIG. 5, during the placement and routing stage 150, an instance of the cell 20 is placed and routed in a design layout. The length of the conductive line 214 may be adjusted to fulfill a design rule and may have different lengths L1, L2, L3, L4 and L5. To deal with the adjustment of the conductive line 214 as a critical internal net, during the cell library kits generation stage, the critical internal net 214 is given a predetermined capacitance z1 associated with the length L1, and may have other different capacitance values z2, z3, z4 and z5 due to the adjusted lengths L2, L3, L4 and L5, respectively, one of which may be selected during the placement and routing stage 150. The length L1 does not extend beyond the cell boundary 20B while the lengths L2 through L5 extend beyond the cell boundary 20B. The lengths L1 through L5 and their associated capacitances may be predetermined during the cell characterization phase and stored as a parameter set in the library 132 for calculating the resultant timing and power parameters of the cell 20. As a result, the table 500 is provided as an array to reflect the various timing or power parameter combinations dependent upon the effect of the critical internal net, in addition to the effects of the input slew rate, input clock slew rate and the output capacitance.

In the above embodiment, the number of predetermined candidate values for each input variable index_1, index_2 and index_3 are shown for illustrational purposes. Other numbers of candidate values are also possible. In some embodiments, more than one critical internal net is identified in performing the cell library kits generation shown in FIG. 3. As a result, the establishing of the table 500 will take into account all of the identified critical internal nets. The input set will further increase in dimension, and therefore the number of rows or columns of the table 500 will increase accordingly. The table 500 is still represented as a two-dimensional lookup table under different dimensions of the input set.

Figure 6A:
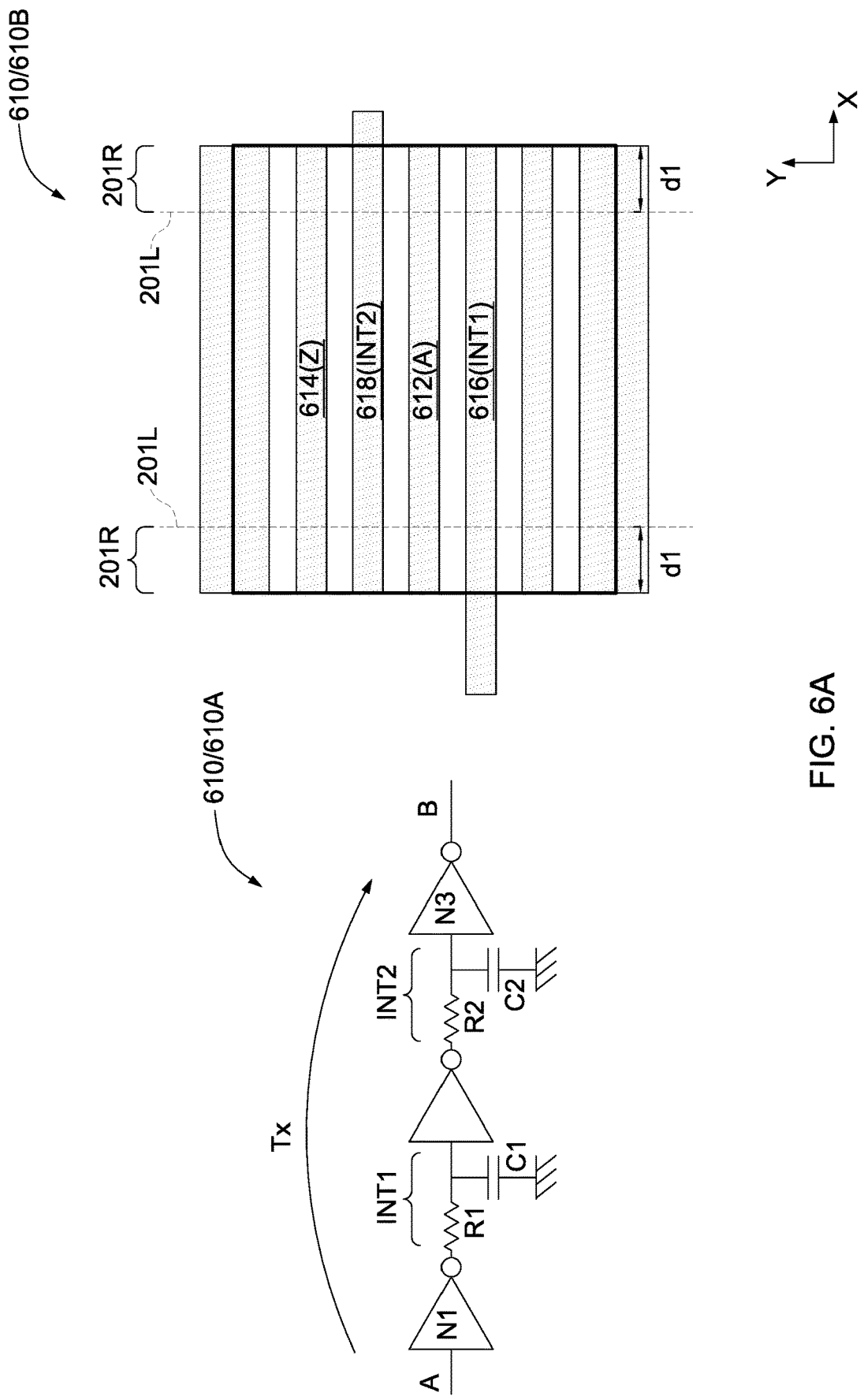
FIG. 6A shows a circuit diagram and a layout of a cell with at least one critical internal net, in accordance with some embodiments of the present disclosure.

FIG. 6A shows a circuit diagram 610A and a layout 610B of a cell 610, in accordance with some embodiments of the present disclosure. The circuit diagram 610A shows that the cell 610 includes three NAND gates N1, N2 and N3 connected in series with connection nodes INT1 and INT2, in which an input signal is provided to the NAND gate N1 through an input terminal A, while the NAND gate N3 provides an output signal to an output terminal B. The layout 610B only shows an exemplary layer of the cell 610, in which a conductive line 612 corresponds the input terminal A and a conductive line 614 correspond to the output terminal B. Although the conductive lines 612 and 614 are arranged in the same layer as illustrated in FIG. 6A, the conductive line 612 and 614 can be arranged in different layers of the layout 610B in other embodiments.

Referring to the circuit diagram 610A and the layout 610B, the connection node INT1 between the NAND gates N1 and N2 are implemented by a conductive line 616, and the connection node INT2 between the NAND gates N2 and N3 are implemented by a conductive line 618. When the conductive line 616 is identified as a critical internal net of the cell 610, the timing and power parameters of the cell 610 are recast by modeling the timing delay or power further based on the conductive line 616 as a critical internal net. In some embodiments, a resistance-capacitance (RC) network of the conductive line 616 is provided, in which the RC network, including an effective resistance R1 and an effective capacitance C1 of the conductive line 616, is incorporated into the connection node INT2 of the circuit diagram 610A. Similarly, when the conductive line 618 is identified as another critical internal net of the cell 610, the timing and power parameters of the cell 610 are recast by modeling the timing delay or power further based on the conductive line 618. In some embodiments, another resistance-capacitance (RC) network of the conductive line 618 is provided, in which the another RC network, including an effective resistance R2 and an effective capacitance C2, of the conductive line 618 is incorporated into the connection node INT2 of the circuit diagram 610A.

Referring to FIG. 5 and FIG. 6A, a timing delay arc Tx is formed between the input terminal A and the output terminal Z. The lookup table of the timing or power parameters for the cell 610 with respect to the timing delay arc Tx can be determined in a manner similar to that for determining the lookup table 500, but with an four-dimensional input set formed of, e.g., the input slew rate of the cell 610, the output capacitance of the cell 610, the capacitance C1 associated with the conductive line 616 and the capacitance C2 associated with the conductive line 618, as far as the timing delays and powers are concerned. In some other embodiments, as far as the timing constraints are concerned, the four-dimensional input set is formed of, e.g., the input slew rate of the cell 610, the input clock slew rate of the cell 610, the capacitance C1 associated with the conductive line 616 and the capacitance C2 associated with the conductive line 618. In some embodiments, the capacitance C1 or C2 is determined according to the adjusted length of the conductive line 616 or 618, respectively, and can be stored in a predetermined parameter set, as discussed with reference to FIG. 5.

Figure 6B:
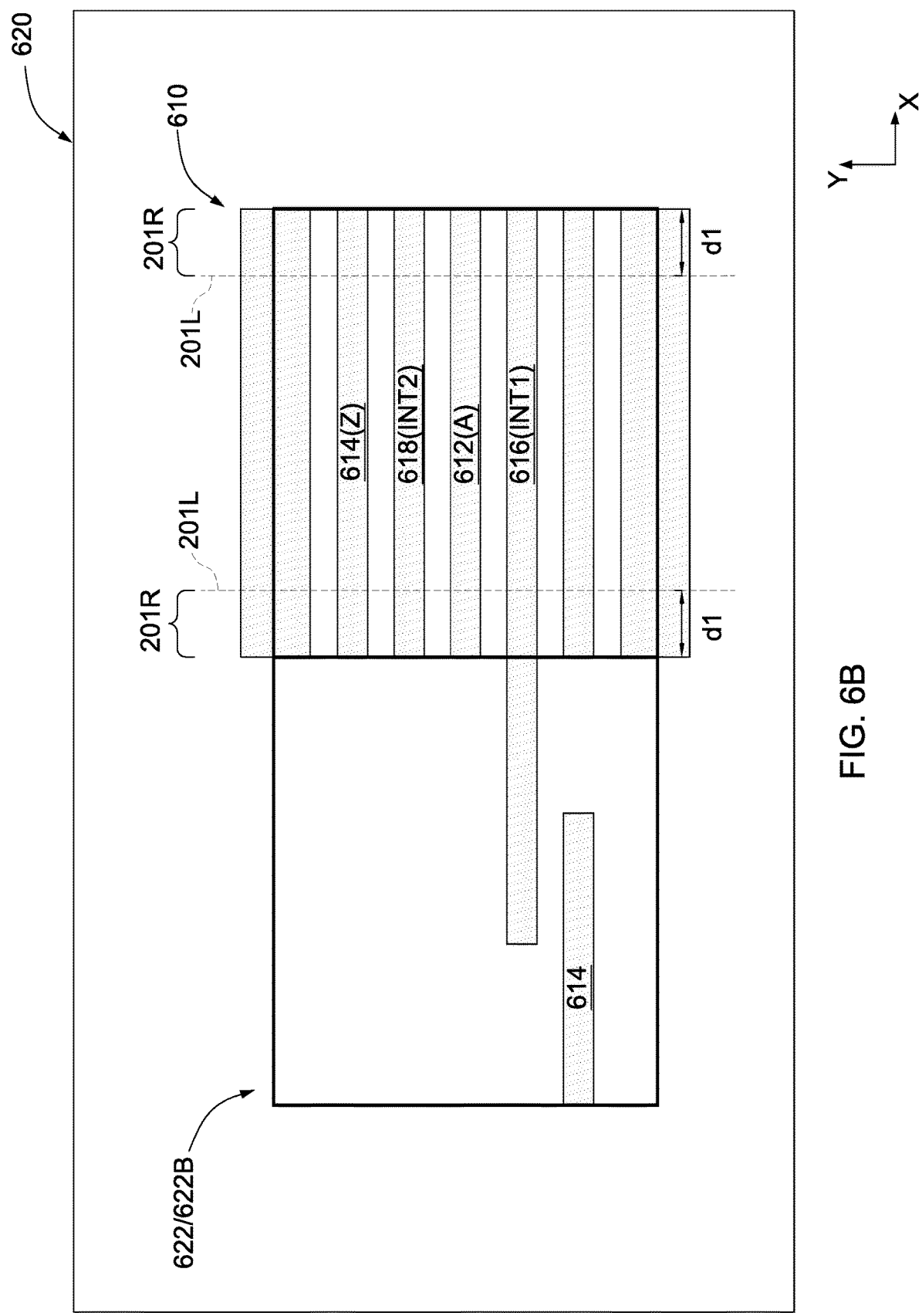
FIG. 6B shows a layout of a cell with at least one critical internal net, in accordance with some embodiments of the present disclosure.

FIG. 6B shows a layout 620, in accordance with some embodiments of the present disclosure. The layout 620 includes the cell 610 and a cell 622, in which the layout 610B of the cell 610 and a layout 622B of the cell 622 are illustrated. The layout 622B only shows an exemplary conductive line 624 and other features are omitted from the layout 622B for clarity. At the placement and routing stage 150, the cells 610 and 622 are placed in a same row along the X-direction, and the cell 622 abuts the cell 610, i.e., the cells 610 and 622 shares one cell side. In some embodiments, during the placement and routing stage 150, an instance of each of the cell 610 and the cell 622 are placed in the design layout 620. The conductive line 616 is routed to extend into the cell 622. The conductive lines 612 and 616 of the cell 610 may be capacitively coupling with the conductive line 624 of the cell 622, and thus an additional coupling capacitance associated with the conductive line 616 is generated to impact the timing and power performance of the cell 610.

Referring to FIG. 5 and FIG. 6B, the lookup table of the timing or power parameters for the cell 610 in the layout 620 is similar to the lookup table 500 but is generated based on a five-dimensional input set. In some embodiments, as far as the timing delays and powers are concerned, the input set is formed of the input slew rate of the cell 610, the output capacitance of the cell 610, the capacitance C1 associated with the conductive line 616, a coupling capacitance C3 between the conductive line 612 (input pin) and the conductive line 624 (or equivalently an input slew rate for the conductive line 612 associated with the conductive line 624), and an input slew rate of the conductive line 624. In the above example, the coupling capacitance C3 generated between the conductive line 612 and the conductive line 624 under different combinations of signals transmitted on the conductive lines 612 and 624 will influence the input slew rate of the conductive line 612 as the input pin of the cell 610. In some embodiments, the input slew rate of the conductive line 624 will further impact the input slew rate of the cell 610. In some embodiments, as far as the timing constraints are concerned, the input set is formed of the input slew rate of the cell 610, the input clock slew rate of the cell 610, the capacitance C1 associated with the conductive line 616, the coupling capacitance C3 between the conductive line 612 and the conductive line 624 (or equivalently an input slew rate for the conductive line n 612 associated with the conductive line 624), and an input slew rate of the conductive line 624. In some embodiments, the coupling capacitance between the conductive line 616 and the conductive line 624 is determined according to the overlapping length between the conductive lines 616 and 624 and can be stored in a predetermined parameter set, as discussed with reference to FIG. 5.

Figure 6C:
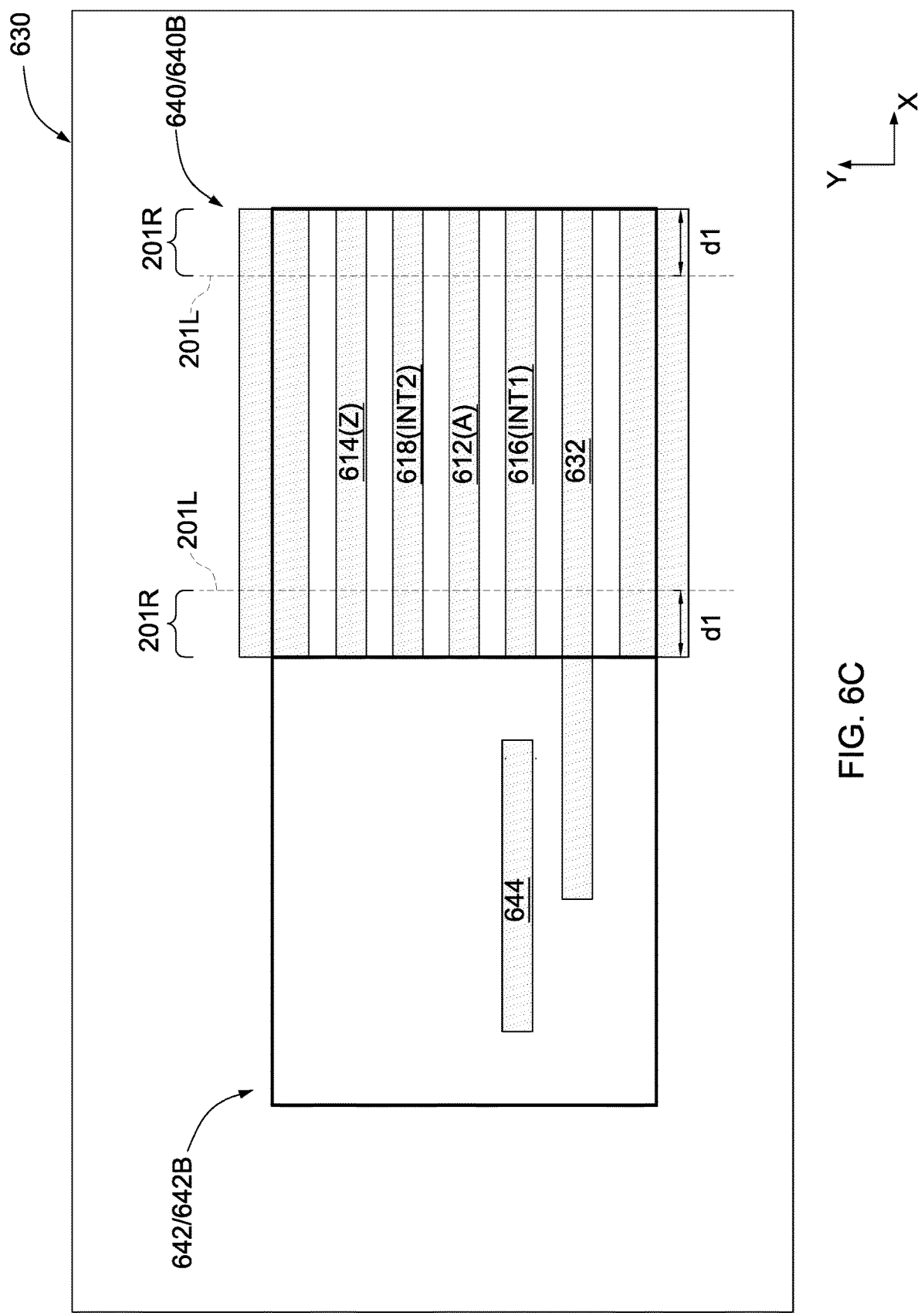
FIG. 6C shows a layout of a cell with at least one critical internal net, in accordance with some embodiments of the present disclosure.

FIG. 6C shows a layout 630, in accordance with some embodiments of the present disclosure. The layout 630 includes a cell 640 and a cell 642, in which the layout 640B of the cell 640 and a layout 642B of the cell 642 are illustrated. The cell 640 is similar to the cell 610 shown in FIG. 6A, in which the cell 640 further includes a conductive line 632. In some embodiments, the conductive line 632 is configured as floating and is electrically isolated from other conductive features. The conductive line 632 may not serve any function of the cell 640. The layout 642B only shows an exemplary conductive line 644 and other features are omitted from the layout 642B for clarity. During the placement and routing stage 150 shown in FIG. 1, the cells 640 and 642 are arranged in a same row along the X-direction, and the cell 642 abuts the cell 640, i.e., the cells 640 and 642 shares one cell side. In some embodiments, during the placement and routing stage 150 of FIG. 1, the conductive line 632 is routed to extend into the cell 642. The conductive lines 612 and 632 of the cell 640 may be capacitively coupling with the conductive line 644 of the cell 642, and thus an additional coupling capacitance associated with the conductive lines 644 is generated to impact the timing and power performance of the cell 640.

Referring to FIG. 5 and FIG. 6C, the lookup table of the timing or power parameters for the cell 640 in the layout 630 is similar to the lookup table 500, but is generated based on a five-dimensional input set. In some embodiments, as far as the timing delays and powers are concerned, the input set is formed of the input slew rate of the cell 640, the output capacitance of the cell 640, a coupling capacitance C4 between the conductive lines 632 and 644, a coupling capacitance C5 between the conductive line 612 (input pin) and the conductive line 644 (or equivalently an input slew rate for the conductive line 612 associated with the conductive line 644), and an input slew rate of the conductive line 644. In the above example, the coupling capacitance C5 generated between the conductive line 612 and the conductive line 644 under different combinations of signals transmitted on the conductive lines 612 and 644 will influence the input slew rate of the conductive line 612 as the input pin of the cell 610. In some embodiments, the input slew rate of the conductive line 644 will further impact the input slew rate of the cell 610. In some embodiments, as far as the timing constraints are concerned, the input set is formed of the input slew rate of the cell 640, the input clock slew rate of the cell 640, the coupling capacitance C4, the coupling capacitance C5 between the conductive line 612 and the conductive line 644 (or equivalently an input slew rate for the conductive line 612 associated with the conductive line 644), and the input slew rate of the conductive line 644. In some embodiments, the coupling capacitance C4 is determined according to the overlapping length between the conductive lines 632 and 644, and can be stored in a predetermined set, as discussed with reference to FIG. 5.

In the discussion of the input set, the second variable may include only the output capacitance. As a matter of fact, an effective resistance may also be determined to form an effective resistance-capacitance (RC) network for the output terminal B of the cell 610. In some embodiments, the effective resistance for the output terminal B is omitted or deemed as constant during the determination of the table 500. Similarly, the determination of the capacitances C3 through C5 associated with the conductive lines 612, 624, 632 or 644, respectively, may include determination of the correspondingly effective resistance associated with the conductive line 612, 624, 632 or 644 to form the respective RC network or the equivalent slew rate of the conductive line 612 or 616.

Figure 6D:
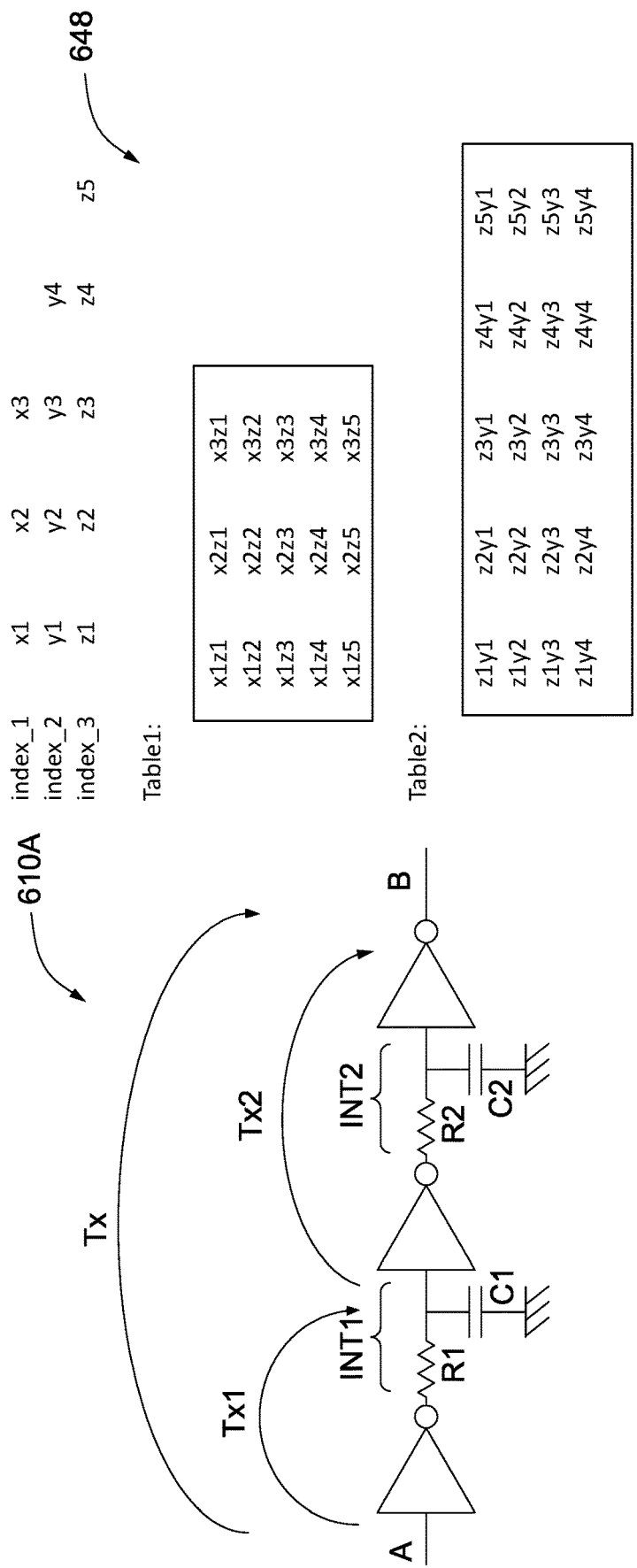
FIG. 6D shows a circuit diagram and a lookup table of timing and power parameters for a cell having two critical internal nets, in accordance with some embodiments of the present disclosure.

FIG. 6D shows the circuit diagram 610A and a lookup table 648 of timing and power parameters for the cell 610, in accordance with some embodiments of the present disclosure. Although the circuit diagram of the cell 610 shown in FIG. 6D is the same as that shown in FIG. 6A, the determination processes of the lookup table may be different in the embodiments shown in FIG. 6A and FIG. 6D. Referring to FIG. 5, as discussed previously, each element of the lookup table of the circuit diagram 610A shown in FIG. 6A is determined based on a four-dimensional input set for the timing delay arc Tx. In contrast, the lookup table 648 is determined where the overall timing delay arc Tx is decomposed into a first timing delay arc Tx1 and a second timing delay arc Tx2, where the first timing delay arc accounts for the timing delay or power between the input terminal A and the connection node INT1, and the second timing delay arc Tx2 accounts for the timing delay or power between the connection node INT1 and the output terminal B.

Based on the decomposition of the timing delay arc Tx, the timing delay or power parameters of the cell 610 can be determined in a two-stage approach by determining the individual timing delay or power parameters with respect to the respective first timing delay arc Tx1 and second timing delay arc Tx2, and adding the individual timing or power parameters determined for the two timing delay arcs Tx1 and Tx2 as the final timing delay or power parameters as the overall timing delay or power for the timing delay arc Tx. For example, the original lookup table with respect to the timing delay arc Tx is generated based on a four-dimensional input set. Alternatively, a first lookup table with respect to the first timing delay arc Tx1 is generated based on a three-dimensional input set formed of, e.g., the input slew rate for the input terminal A and the output capacitance for the connection node INT1, and the capacitance associated with the conductive line 616. Similarly, a second lookup table with respect to the second timing delay arc Tx2 is generated based on another three-dimensional input set formed of, e.g., the input slew rate for the connection node INT1, the output capacitance of the output terminal B, and the capacitance associated with the conductive line 618. In some embodiments, the timing constraint parameters are not determined based on the two-stage approach given above.

Figure 6E:
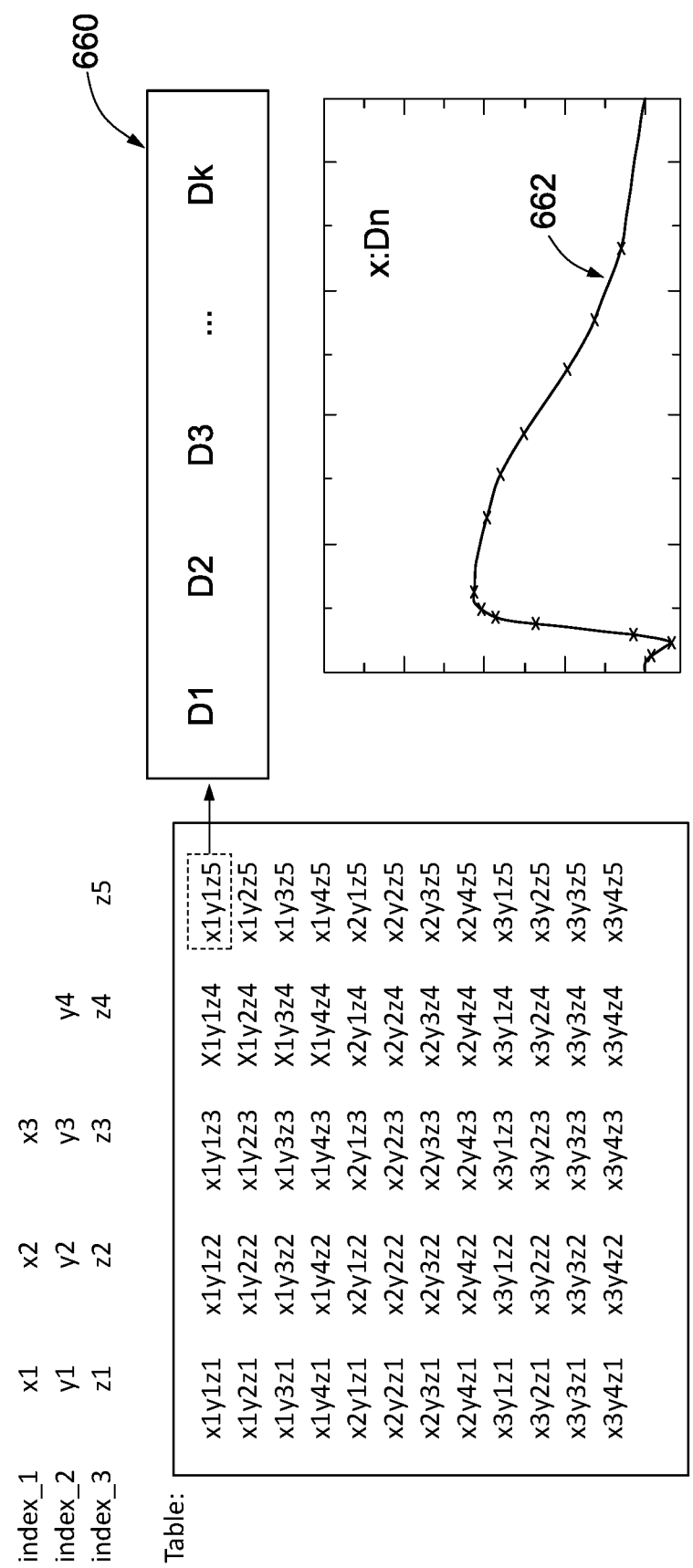
FIG. 6E shows a lookup table of a power parameter for a cell with at least one critical internal net, in accordance with some embodiments of the present disclosure.

FIG. 6E shows a lookup table 650 of power parameters for the cell 610, in accordance with some embodiments of the present disclosure. In some embodiments, the lookup table 650 is represented in a form of a data structure. For example, each entry of the table 650 generated based on the three-dimensional input set points to a corresponding data array 660 of current values seen at the output of the cell 610, in which the data array 660 represents temporal current sampled data Dn, n=1, 2, . . . k, where the integer k denotes the number of the current sample data Dn. Also shown in FIG. 6E is a current waveform 662, where the sample data Dn can be seen as the samples of the current waveform 662. By help of the temporal current sample data Dn, the lookup table 650 of the power parameter for the cell 610 can provide more information on the effective RC network for the cell 610, e.g., the power profile, the power peak value and the elapsed time of the power exceeding a predetermined power level, instead of only a static averaged power value along time. The timing delays, timing constraints and powers of the table 500 can be determined based on a RC network for the output terminal B derived by the sample data Dn instead of merely a capacitance value. The timing analysis for the cell 610 conducted based on the sample data Dn can be performed more accurately.

Figure 7:
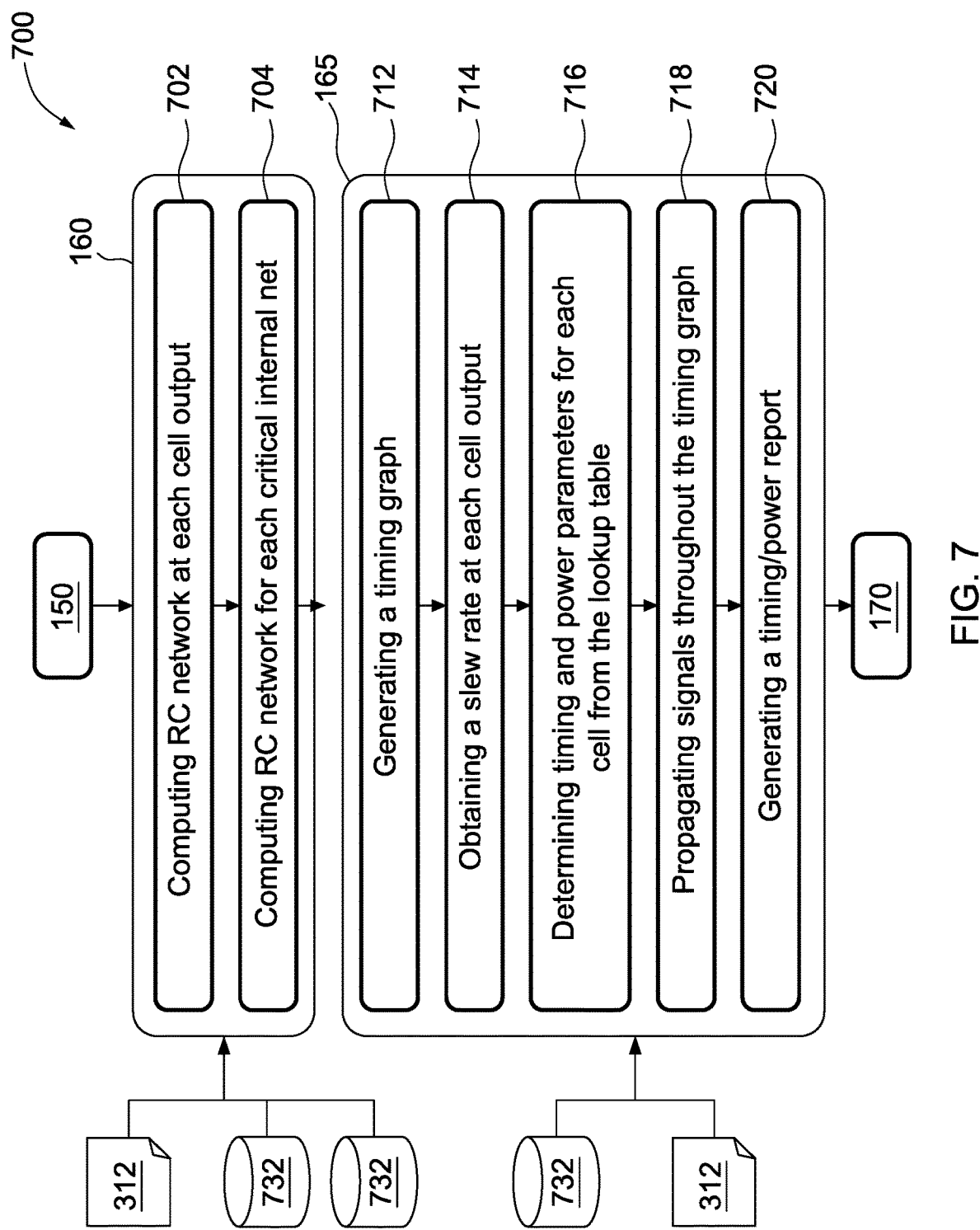
FIG. 7 is flowchart of a method of static timing analysis, in accordance with some embodiments of the present disclosure.

FIG. 7 is a flowchart of a method 700 of a static timing analysis operation of a circuit, in accordance with some embodiments of the present disclosure. It shall be understood that additional steps can be provided before, during, and after the steps shown in FIG. 7, and some of the steps described below can be replaced or eliminated, for additional embodiments of the method 700. The order of the steps may be interchangeable. Some of the steps may be performed concurrently or independently.

The method 700 may include the stage 160 of parameter extraction and the stage 165 of performing timing/power analysis shown in FIG. 1. In some embodiments, before entering stage 160, a library file 312 of the library 132 is provided for the abstract views of the cells in the circuit based on the design data or the design layout of the circuit. In addition, a library file 314 of the library 132 is provided for timing/power characterization of the cell based on the design data or the design layout of each of the cells in the circuit. The library file 314 may provide a lookup table or array for the timing and power parameters based on combinations of a multidimensional input set. A library 732 is provided, which includes a design layout of the cells in the circuit after the stage 150 of placement and routing. Further, another library 734 is provided, which includes design layout of the interconnection features in the circuit during or after the stage 150 of placement and routing. In addition, yet another library 736 is provided, which includes netlist data of the circuit after the stage 150 of placement and routing.

In stage 160 of parameter extraction, at step 702, after the placement and routing stage 150 is performed, an RC network of each of the routed conductive lines in the layout is computed. In some embodiments, an RC network at the output of each cell or gate is computed and provided. In some embodiments, the output capacitance, e.g., with reference to FIG. 5 for determining the timing and power parameters, includes the RC network, i.e., the effective resistance and the effective capacitance, at the output of each cell or gate.

At step 704, an RC network for each of the critical internal net of each cell or gate in the circuit is computed. The information of the critical internal nets may be provided by the library file 312. The RC networks of the critical internal nets may be incorporated to the netlist or layout of the circuit.

At stage 165, during step 712, a timing graph is generated for the circuit and each of the cells or gates. The timing graph may include a plurality of timing delay arcs for the cells or gates and the RC networks within or between the cells or gates to formulate the connection topology between the cells or gates of the circuit. At step 714, a slew rate or an equivalent capacitance at the output of each cell or gate is determined based on the timing graph.

At step 716, the timing parameters, e.g., the estimated timing delay values and timing constraint values, and power parameters for each cell or gate are determined by selecting suitable values from the lookup tables. An entry of the lookup table in the library file 314 is selected as the estimated timing parameter or power parameter of a cell where the variables of the multidimensional input set match the slew rate or the equivalent capacitance values provided at step 714. In some cases where the capacitance the values of a cell output or a critical internal net does not match exactly any entry of the input set, an interpolation or approximation approach based on the existing entries in the lookup table is adopted to determine the timing parameters and the power parameters of the cell. At step 718, a timing analysis is performed, in which input signals and clock signals are propagated throughout the timing graph to determine the timing delays of each cell or gate in the timing graph based on the estimated timing delay values and power values for each cell provided in step 716. The resultant timing delays and power consumption of the circuit can thus be determined.

At step 720, a timing/power report is generated based on the timing analysis result obtained in step 718 to determine whether the designed circuit with the resultant timing delays and powers meet the design specification.

Figure 8:
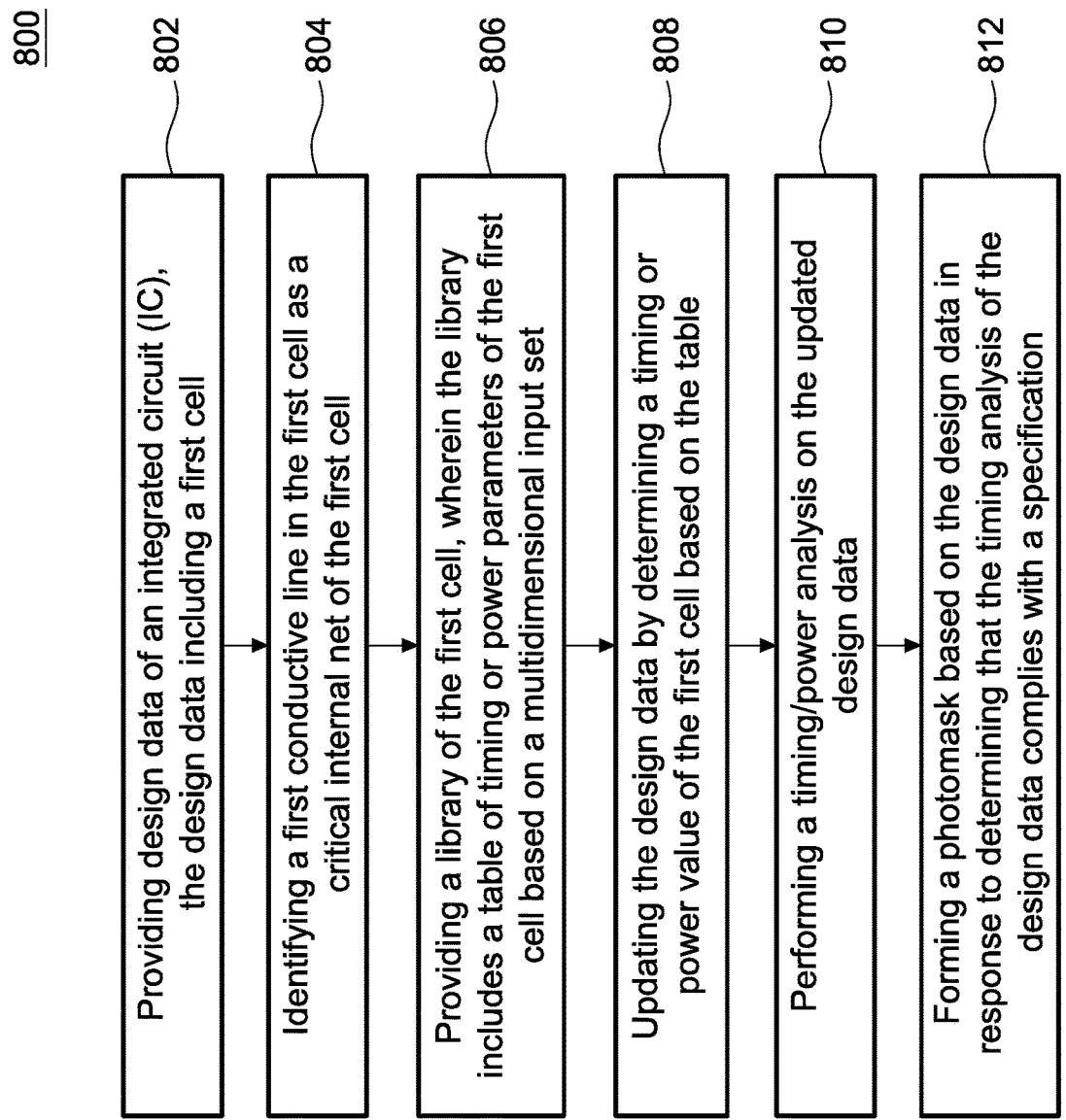
FIG. 8 is a flowchart of a method of fabricating a circuit, in accordance with some embodiments of the present disclosure.

FIG. 8 is a flowchart of a method 800 of fabricating a circuit, in accordance with some embodiments of the present disclosure. It shall be understood that additional steps can be provided before, during, and after the steps shown in FIG. 8, and some of the steps described below can be replaced or eliminated, for additional embodiments of the method 800. The order of the steps may be interchangeable. Some of the steps may be performed concurrently or independently.

At step 802, design data of an integrated circuit (IC) are provided, the design data including a first cell. The design data may be provided through the stage 130 of synthesis or the stage 150 of placement and routing. In some embodiments, the design data includes netlist data or a design layout of the IC.

At step 804, a first conductive line in the first cell is identified as a critical internal net of the first cell. In some embodiments, the first conductive line is electrically connected between an input terminal of the first cell and an output terminal of the first cell, wherein the first conductive line includes a portion falling on a peripheral region of the first cell from a top-view perspective. In some embodiments, step 804 is performed prior to step 802. In some embodiments, the information of critical internal net is declared in an abstract view of a library file, e.g., library file 312.

At step 806, a library of the first cell is provided or updated, wherein the library includes a table of timing or power parameters of the first cell based on a multidimensional input set. The multidimensional input set includes an input variable associated with the critical internal net. In some embodiments, step 806 is performed prior to step 802 or 804. The updated library is provided along with library files e.g., library file 314.

At step 808, the design data is updated by determining a timing or power value of the first cell based on the table. In some embodiments, the updating process is discussed with reference to steps 702, 704. Step 808 may be performed after the stage 150 of placement and routing and may correspond to step 716 of method 700.

At step 810, a timing/power analysis is performed on the updated design data. In some embodiments, the timing analysis is performed alone on the design data. The timing analysis may be alternatively performed along with the power analysis. In some embodiments, the timing or power analysis is discussed in greater detail with reference to stage 165, or steps 712, 714. 716, 718 and 720. In some embodiments shown in FIG. 7, the process of the timing or power analysis covered steps 712, 714. 716, 718 and 720. In some other embodiments shown in FIG. 8, the process of the timing or power analysis covered only steps 718 and 720. At step 812, a photomask is formed based on the design data in response to determining that the timing analysis of the design data complies with a specification. The specification may include a timing violation rule or a power constraint rule of the circuit. In some embodiments, a pattern of the layout associated with the design data is transferred to the photomask. In some embodiments, the IC is fabricated based on the photomask.

Figure 9:
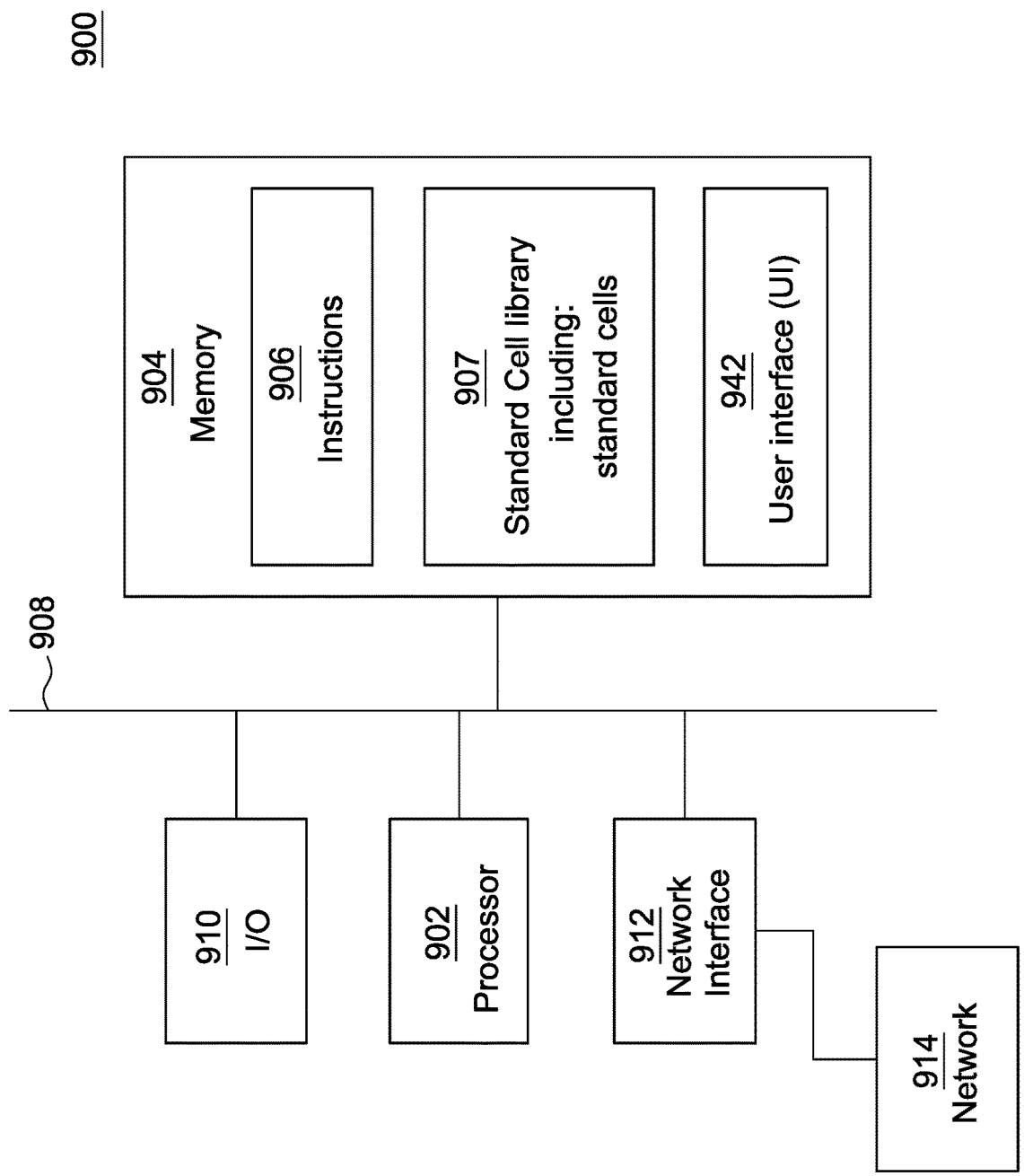
FIG. 9 is a block diagram of an electronic design automation (EDA) system in accordance with some embodiments.

FIG. 9 is a block diagram of an electronic design automation (EDA) system 900 in accordance with some embodiments.

In some embodiments, EDA system 900 includes a system performing at least one of an APR operation, a library generation, a parameter extraction, and a timing analysis operation. Methods described herein in accordance with one or more embodiments, are implementable, for example, using EDA system 900, in accordance with some embodiments.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) an EDA tool which implements a portion or all of, e.g., the methods described herein in accordance with one or more embodiments (hereinafter, the noted processes and/or methods).

Processor 902 is electrically coupled to the computer-readable storage medium 904 via a bus 908. The processor 902 is also electrically coupled to an input/output (I/O) interface 910 by the bus 908. A network interface 912 is also electrically connected to the processor 902 via the bus 908.

The network interface 912 is connected to a network 914, so that the processor 902 and the computer-readable storage medium 904 are capable of connecting to external elements via the network 914. The processor 902 is configured to execute the computer program code 906 encoded in the computer-readable storage medium 904 in order to cause the system 900 to be usable for performing a portion or all of the noted processes and/or methods. In one or more embodiments, the processor 902 is a central processing unit (CPU), a multi-processor, a distributed processing system, an application specific integrated circuit (ASIC), and/or another suitable processing unit.

In one or more embodiments, the computer-readable storage medium 904 is an electronic, magnetic, optical, electromagnetic, infrared, and/or a semiconductor system (or apparatus or device). For example, the computer-readable storage medium 904 includes a semiconductor or solid state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk read only memory (CD-ROM), a compact disk-read/write (CD-R/W), and/or a digital video disc (DVD).

In one or more embodiments, the storage medium 904 stores the computer program code 906 configured to cause the system 900 (where such execution represents (at least in part) the EDA tool) to be usable for performing a portion or all of the noted processes and/or methods. In one or more embodiments, the storage medium 904 also stores information which facilitates performing a portion or all of the noted processes and/or methods. In one or more embodiments, the storage medium 904 stores a library 907, which may be similar to the library 132 shown in FIG. 1, of standard cells including such standard cells as disclosed herein.

The EDA system 900 includes the I/O interface 910. The I/O interface 910 is coupled to external circuitry. In one or more embodiments, the I/O interface 910 includes a keyboard, keypad, mouse, trackball, trackpad, touchscreen, and/or cursor direction keys for communicating information and commands to processor 902.

The EDA system 900 also includes the network interface 912 coupled to the processor 902. The network interface 912 allows the system 900 to communicate with the network 914, to which one or more other computer systems are connected. The network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 900.

The system 900 is configured to receive information through the I/O interface 910. The information received through the I/O interface 910 includes one or more of instructions, data, design rules, libraries of standard cells, and/or other parameters for processing by the processor 902. The information is transferred to the processor 902 via the bus 908. EDA system 900 is configured to receive information related to a user interface (UI) through the I/O interface 910. The information is stored in the computer readable medium 904 as UI 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by the EDA system 900.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In accordance with one embodiment of the present disclosure, a method, performed by at least one processor, including: providing a design data of an integrated circuit (IC), the design data comprising a first cell; identifying a first conductive line in the first cell as a critical internal net of the first cell, wherein the first conductive line is electrically connected between an input terminal of the first cell and an output terminal of the first cell, wherein the first conductive line includes a portion falling on a peripheral region of the first cell from a top-view perspective; providing a library of the first cell, wherein the library includes a table of timing parameters or power parameters of the first cell based on a multidimensional input set associated with the critical internal net; updating the design data by determining a timing or power value of the first cell based on the table; performing a timing analysis on the updated design data; and forming a photomask based on the updated design data in response to determining that the timing analysis of the updated design data complies with a specification.

In accordance with another embodiment of the present disclosure, a system, comprising one or more processors and one or more programs including instructions which, when executed by the one or more processors, cause the system to: provide a design data of an integrated circuit (IC), the design data comprising a first cell; identify a first conductive line in the first cell as a critical internal net of the first cell, wherein the first conductive line is electrically connected between an input terminal of the first cell and an output terminal of the first cell, wherein the first conductive line is capable of being routed to extend beyond a boundary line of the first cell; provide a library of the first cell, wherein the library includes a table of timing parameters or power parameters of the first cell based on a multidimensional input set associated with the critical internal net; update the design data by determining a timing or power value of the first cell based on the table; and perform a timing analysis on the updated design data.

In accordance with another embodiment of the present disclosure, a non-transitory computer readable storage medium, comprising instructions which, when executed by a processor, perform the steps of: providing a design data of an integrated circuit (IC), the design data comprising a first cell; identifying a first conductive line in the first cell as a critical internal net of the first cell, wherein the first conductive line is electrically connected between an input terminal of the first cell and an output terminal of the first cell; providing a library of the first cell, wherein the library includes a table of power parameters of the first cell based on a multidimensional input set associated with the critical internal net; computing a resistance-capacitance (RC) network of the first conductive line and incorporating the RC network into the design data; updating the design data by determining a power value of the first cell based on the table and the RC network; and performing a power analysis on the updated design data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, performed by at least one processor, comprising:
    providing a design data of an integrated circuit (IC), the design data comprising a first cell;
    identifying a first conductive line in the first cell as a critical internal net of the first cell, wherein the first conductive line is electrically connected between an input terminal of the first cell and an output terminal of the first cell, wherein the first conductive line includes a portion falling on a peripheral region of the first cell from a top-view perspective;
    providing a library of the first cell, wherein the library includes a table of timing parameters or power parameters of the first cell based on a multidimensional input set associated with the critical internal net;
    updating the design data by determining a timing or power value of the first cell based on the table;
    performing a timing analysis on the updated design data; and
    forming a photomask based on the updated design data in response to determining that the timing analysis of the updated design data complies with a specification.

2. The method of claim 1, further comprising fabricating the IC according to a pattern of the photomask.

3. The method of claim 1, wherein the multidimensional input set is formed of a first input variable as a first capacitance associated with the first conductive line.

4. The method of claim 3, wherein the first capacitance is determined based on a length of the first conductive line.

5. The method of claim 3, wherein the providing of the design data further comprises performing a placement and routing operation to generate a design layout, the providing of the design layout comprising placing an instance of the first cell in the design layout and routing the first conductive line to extend beyond a cell boundary of the first cell.

6. The method of claim 5, wherein the performing of the placement and routing operation further comprises placing a second cell in the design layout adjacent to the first cell, wherein the second cell comprises a second conductive line and the first conductive line extends into the second cell, wherein the first capacitance is determined based on a first coupling capacitance between the first conductive line and the second conductive line.

7. The method of claim 6, wherein the multidimensional input set is further formed of a second input variable as an input slew rate of the first cell associated with the second conductive line.

8. The method of claim 6, wherein the first cell further comprises a third conductive line configured as floating, wherein the multidimensional input set is further formed of a second coupling capacitance between the second conductive line and the third conductive line.

9. The method of claim 5, further comprising performing a resistance-capacitance (RC) extraction operation to compute an RC network associated with the first conductive line, and incorporating the RC network into the design data.

10. The method of claim 1, further comprising generating an abstract view of the first cell, the abstract view providing a layer index and coordinates of the first conductive line.

11. A system, comprising one or more processors and one or more programs including instructions which, when executed by the one or more processors, cause the system to:
provide a design data of an integrated circuit (IC), the design data comprising a first cell;
identify a first conductive line in the first cell as a critical internal net of the first cell, wherein the first conductive line is electrically connected between an input terminal of the first cell and an output terminal of the first cell, wherein the first conductive line is capable of being routed to extend beyond a boundary line of the first cell;
provide a library of the first cell, wherein the library includes a table of timing parameters or power parameters of the first cell based on a multidimensional input set associated with the critical internal net;
update the design data by determining a timing or power value of the first cell based on the table; and
perform a timing analysis on the updated design data.

12. The system of claim 11, wherein the instructions which, when executed by the one or more processors, further cause the system to generate an abstract view including a location and a size of the first conductive line.

13. The system of claim 12, wherein the instructions which, when executed by the one or more processors, further cause the system to perform resistance-capacitance extraction on the first conductive line according to the design data.

14. The system of claim 11, wherein the multidimensional input set is formed of an input slew rate of the first cell, an output capacitance of the first cell and a capacitance associated of the first conductive line.

15. The system of claim 14, wherein the capacitance associated with the first conductive line is dependent upon a length of the first conductive line.

16. The system of claim 14, wherein the capacitance associated with the first conductive line is a coupling capacitance between the first conductive line and a second conductive line in a second cell, adjacent to the first cell, of the design data.

17. The system of claim 11, wherein the table of timing or power parameters is determining by:
decomposing an overall timing delay arc of the first cell into a first timing delay arc and a second timing delay arc;
determining a first set of timing or power parameters for the first timing delay arc based on an input slew rate of the first cell and an output capacitance associated with the first conductive line;
determining a second set of timing or power parameters for the second timing delay arc based on an input slew rate of the first conductive line and an output capacitance of the first cell; and
obtaining the table of timing or power parameters for the overall timing delay arc by adding the first set of timing or power parameters and the second set of timing or power parameters.

18. A non-transitory computer readable storage medium, comprising instructions which, when executed by a processor, perform the steps of:
providing a design data of an integrated circuit (IC), the design data comprising a first cell;
identifying a first conductive line in the first cell as a critical internal net of the first cell, wherein the first conductive line is electrically connected between an input terminal of the first cell and an output terminal of the first cell;
providing a library of the first cell, wherein the library includes a table of power parameters of the first cell based on a multidimensional input set associated with the critical internal net;
computing a resistance-capacitance (RC) network of the first conductive line and incorporating the RC network into the design data;
updating the design data by determining a power value of the first cell based on the table and the RC network; and
performing a power analysis on the updated design data.

19. The non-transitory computer readable storage medium of claim 18, wherein each entry of the table is determined based on an input set comprising an input slew rate of the first cell, an input clock slew rate of the first cell and a capacitance associated with the first conductive line.

20. The non-transitory computer readable storage medium of claim 19, wherein each entry of the table points to an array of current sample data of the first cell along with time.

* * * * *